US011209288B2

(12) United States Patent
Stöcker et al.

(10) Patent No.: US 11,209,288 B2
(45) Date of Patent: Dec. 28, 2021

(54) CONTROL SYSTEM OF AN ENTITY

(71) Applicants: Carsten Stocker, Hilden (DE); Jürgen Waffner, Essen (DE); Mark Dijksmann, The Hague (NL)

(72) Inventors: Carsten Stöcker, Hilden (DE); Jürgen Waffner, Essen (DE); Mark Dijksmann, The Hague (NL)

(73) Assignee: innogy Innovation GmbH, Essen (DE)

( * ) Notice: Subject to any disclaimer, the term of this patent is extended or adjusted under 35 U.S.C. 154(b) by 318 days.

(21) Appl. No.: 15/992,956

(22) Filed: May 30, 2018

(65) Prior Publication Data
US 2018/0274943 A1 Sep. 27, 2018

Related U.S. Application Data

(63) Continuation of application No. PCT/EP2015/078094, filed on Nov. 30, 2015.

(51) Int. Cl.
*G06Q 50/06* (2012.01)
*G06Q 20/22* (2012.01)
(Continued)

(52) U.S. Cl.
CPC .............. *G01D 4/10* (2013.01); *G06Q 20/145* (2013.01); *G06Q 20/223* (2013.01); *G06Q 40/04* (2013.01);
(Continued)

(58) Field of Classification Search
CPC ........ G01D 4/10; G06Q 20/223; G06Q 40/04; G06Q 20/145; G06Q 50/06; G07F 15/00; H04L 9/0637; H04L 67/1042
See application file for complete search history.

(56) References Cited

U.S. PATENT DOCUMENTS

| 5,924,486 A * | 7/1999 | Ehlers ................ G05D 23/1923 |
| | | 165/238 |
| 2011/0043035 A1* | 2/2011 | Yamada ................. H05B 47/19 |
| | | 307/39 |

FOREIGN PATENT DOCUMENTS

| JP | 2013-187935 A | 9/2013 |
| JP | 2003-324850 A | 11/2013 |
| WO | WO 2015/159682 A1 | 10/2015 |

OTHER PUBLICATIONS

Panikkar et al., ADEPT: An IoT Practitioner Perspective, Draft Copy for Advance Review, IBM, Jan. 2015 (Year: 2015).*
(Continued)

*Primary Examiner* — Daniel R Miller
(74) *Attorney, Agent, or Firm* — Reinhart Boerner Van Deuren P.C.

(57) ABSTRACT

Embodiments of the invention relate to a control system of a first entity. The control system has a forecast module that creates a supply medium plan of a supply medium unit of the first entity. The supply medium unit is a supply medium consumer, a supply medium producer, and/or supply medium storage. The supply medium unit connects to a physical supply channel network. A peer-to-peer module receives at least one supply medium offer message of a further entity by communicating with a peer-to-peer application of a peer-to-peer network. The peer-to-peer module causes generation of a supply medium transaction agreement about the physical exchange of a supply medium between the first and further entity through the peer-to-peer application based on the supply medium plan and the supply medium offer message. A controlling module controls the supply medium unit in dependence of the generated supply medium transaction agreement.

13 Claims, 5 Drawing Sheets

(51) Int. Cl.
*G06Q 20/14* (2012.01)
*H04L 9/06* (2006.01)
*H04L 29/08* (2006.01)
*G01D 4/10* (2006.01)
*G06Q 40/04* (2012.01)
*G07F 15/00* (2006.01)

(52) U.S. Cl.
CPC ............ *G06Q 50/06* (2013.01); *G07F 15/00* (2013.01); *H04L 9/0637* (2013.01); *H04L 67/1042* (2013.01)

(56) References Cited

OTHER PUBLICATIONS

Pureswaran et al., Empowering the edge, Use case abstract for the ADEPT proof-of-concept, Apr. 2015 (Year: 2015).*
Spam et al., Laboratory Testing of Demand-Response Enabled Household Appliances, 2013 (Year: 2013).*
Panikkar et al., ADEPT: An IoT Practitioner Perspective, Draft Copy for Advance Review, IBM, Jan. 2015, available at https://archive.org/details/pdfy-esMcC00dKmdo53-_on Jan. 9, 2015 (Year: 2015).*
Panikkar, S. et al., "Adept: An IoT Practitioner Perspective—Draft Copy for Advance Review," IBM/Samsung's proof of concept draft paper, Jan. 7, 2015, CoinDesk, as submitted in U.S. Appl. No. 14/711,740, filed Nov. 16, 2015 (Year: 2015).*
Anonymous: Ethereum Enabled Community Energy Makret Sharing Economy Phase 1; Renewable Energy Certificates (RECs), Microgrids, Smart Meters and Ethereum; Nov. 6, 2015, pp. 1-33; Retrieved from the Internet: https://www.linkedin.com/pulse/ethereum-enabled-community-energy-market-sharing-economy-john-lilic.
Anonymous: "Block chain (database)—Wikipedia, the free encyclopedia", Nov. 29, 2015; Retrieved from the Internet: https://en.wikipedia.org/wiki/Block_chain.
Bitfury Group. "Smart Contracts on Bitcoin Blockchain." Bitfury Group Limited, Sep. 4, 2015, pp. 1-20. https://bitfury.com/content/downloads/contracts-1.1.1.pdf. dated Sep. 4, 2015.
Hanada et al., "Smart Contracts for Machine-to-Machine Communication: Possibilities and Limitations." 2018 IEEE International Conference on Internet of Things and Intelligence System (IOTAIS), 2018, Bali, pp. 130-136.
Zhang et al. "An IoT Electric Business Model Based on the Protocol of Bitcoin." 18$^{th}$ International Conference on Intelligence in Next Generation Networks, 2015, pp. 184-191.

* cited by examiner

CONTROL SYSTEM OF AN ENTITY

CROSS-REFERENCE TO RELATED PATENT APPLICATION

This patent application is a continuation of PCT/EP2015/078094, filed Nov. 30, 2015, the entire teachings and disclosure of which are incorporated herein by reference thereto.

FIELD OF THE INVENTION

The invention relates to a control system of entity, a home automation controller, a supply system and a method for operating a control system.

BACKGROUND OF THE INVENTION

Systems for supplying entities with a supply medium are known in the art. Examples of supply systems which are not exhaustive are electrical supply networks, gas supply networks, water supply networks and district heating networks.

All supply systems are characterized in the present application in that in a supply system at least one supply medium is transferred via at least one physical, in particular grid-based, supply channel network. Examples of supply media which are not exhaustive are electrical current or electrical power, water, such as fresh water, waste water or water for irrigation, gaseous media such as natural gas or a similar (combustible) gas, heat, for example in the form of hot air, and cold, for example in the form of cold air.

A physical supply channel network may at least comprise a physical, grid-based supply channel. The at least one physical supply channel of a supply channel network may be an electrical line, preferably a plurality of electrical energy lines, in the case of an electrical supply system such as an electricity network. In addition, with other supply systems such as gas, heat or water supply systems, the physical, in particular grid-based, supply channel network may be formed by at least one fluid line, e.g. in the form of a pipeline, in particular a network of pipelines.

The supply channel network may be, at least in part, a public supply channel network and/or, at least in part, a private supply channel network, such as a separate isolated network.

The at least one physical supply channel network of a supply system may, in particular, connect at least two entities to one another. In an exemplary electrical supply system, at least a first entity comprising at least one supply medium unit in form of an electrical consumer may be connected to another entity comprising at least one supply medium unit in form of an electrical producer. The consumer can be supplied with electrical power by the producer via a physical channel of the supply channel network.

Common to all prior art supply systems are that a central subsystem, a central process and/or a central organization or instance is additionally provided, in order to generate supply medium transaction agreements with the first entity and also with the other entity. In other words, the purchase and sale of a supply medium is centrally controlled by a central instance. Trade in the supply medium takes place exclusively via this or possibly a further central instance.

Technically speaking, a corresponding supply system is realized according to the state of the art by a client-server structure. The central organization or instance is created by one or a plurality of central servers. A server of this kind or a platform can be distributed and located on different computing devices, for example. This means that a virtual server can be realized by a cloud. For example, a centrally arranged database can be provided. Examples from the state of the art of databases of this kind which are frequently also referred to as a platform are marketplace databases or cloud platforms, delivery fulfilment databases or cloud platforms or billing systems or cloud services. In particular, a central instance can be configured to order or trade in the supple medium, carry out the billing process, oversee payment and/or manage the portfolio. In particular, the central server in a supply medium transaction agreement is used as a confidential instance for the at least two entities. The central instance, such as a server or a platform, defines the rules. Because these supply medium transaction agreements are performed by the central server, it is ensured that the processes are carried out correctly for all entities involved (consumers, producers, etc.). In other words, a central instance prevents tampering by one of the participating entities and/or by third parties.

Based on an example of an electrical supply network, a typical prior art supply system 100 is described by means of FIG. 1. FIG. 1 shows an exemplary embodiment of a prior art supply system 100. The supply system 100 shown comprises at least one physical supply channel network 102. The physical supply channel network 102 is formed by one or a plurality of electrical lines, for example, such as earth connections and/or overland connections. In addition, a physical supply channel network 102 may comprise (not shown) transformer devices and the like.

A first entity 104 and a further entity 106 are connected to the physical supply channel network 102 via electrical connections 108. A connection 108 may be configured for the bidirectional exchange of current and power, respectively. For example, the first entity 104 may be a household 104 which comprises one or a plurality of supply medium unit/s 110, e.g. electrical consumers 110. The first entity 104 may therefore also be referred to as a consumer 104. The consumer 104 can obtain power from the supply systems 100, in particular from the physical supply channel network 102, via the corresponding connection 108.

In addition, the first entity 104 comprises a control system 120. The control system 120, such as a home automation controller 120, can be configured to control the at least one consumer 110. For instance, the control system 120 can comprise a controlling module configured e.g. to wirelessly activate (or deactivate) an electrical consumer 110.

The further entity 106, for example a household 106, comprises also supply medium units 112, 114. The further entity 106 may have in addition to at least one electrical consumer 112 at least one electrical producer 114 in the form of a photovoltaic device 114, for example. The further entity 106 is therefore producer and consumer. An entity 106 of this kind can be referred to as a prosumer (producer and consumer) 106. The prosumer 106 can obtain power from the supply system 100, in particular from the physical supply channel network 102, via the corresponding connection 108 or feed it into the supply system 100, in particular into the physical supply channel network 102.

In addition, a central server 116, in particular a central management server 116 may be provided. The central management server 116 is configured to manage the supply system 100. The server 116 can communicate with the at least two entities 104, 106 via communications connections 118, for example internet connections, or by manual data readout. In particular, in order to communicate with the server 116 each entity 104, 106 may have a client device (not shown).

This means that the central management server 116 can, based e.g. on a query message from the client device of the first entity 104, generate a supply medium transaction agreement between the management server 116 and the first entity 104 about the exchange, in particular the delivery, of a supply medium quantity for a future period (e.g. one or more years). Moreover, in a corresponding manner, a supply medium transaction agreement can be generated between the management server 116 and the further entity 106 about the exchange, for example the acceptance, of supply medium from the further entity 106. The supply medium may then be transferred from the further entity 106 to the first entity 104 via the physical supply channel network 102. In this way, a supply medium transaction agreement has been indirectly generated between the entities 104, 106. Alternatively, by means of the central server 116, a supply medium transaction agreement can be generated between the entities 104, 106. The subsequent billing based on the quantity of supply medium actually exchanged is also carried out by the central instance 116. For example, the metering modules of the respective entities 104, 106 can be read out from the server 116, analysed and then billed according to the analysis.

The disadvantage of server-client structures of this kind, particularly the server (or platform), apart from the high transaction costs, is that the central instance or central server manages customer data. A persistent problem affecting the central instance is that of protecting the customer data stored on one server/a plurality of servers from access by unauthorized third parties. In particular, a high degree of security expenditure is required, in order to prevent customer data, billing data, forecast data, etc. from being tampered with. This in turn leads to higher transaction costs.

A further disadvantage is that a control system of an entity controls supply medium units only depending on user specifications. This results in an inefficient operation of at least one supply medium unit.

Therefore, the object of the invention is to provide a control system of an entity which simplifies the generation of a supply medium transaction agreement and, at the same time, offers a high level of security and increases the efficiency of the operation of at least one supply medium unit.

BRIEF SUMMARY OF THE INVENTION

The object is solved according to a first aspect of the invention by a control system as disclosed herein. The control system of a first entity comprises at least one forecast module configured to create at least one supply medium plan of at least one supply medium unit of the first entity. The at least one supply medium unit is a supply medium consumer and/or a supply medium producer and/or a supply medium storage. The at least one supply medium unit is connectable to at least one physical supply channel network. The control system comprises at least one peer-to-peer module configured to receive at least one supply medium offer message of at least one further entity by communicating with at least one peer-to-peer application of at least one peer-to-peer network. The peer-to-peer module is configured to cause generation of a supply medium transaction agreement about the physical exchange of a supply medium between the first entity and the further entity by means of the peer-to-peer application at least based on the supply medium plan and the at least one supply medium offer message. The control system comprises at least one controlling module configured to control the at least one supply medium unit in dependence of the generated supply medium transaction agreement.

In contrast to prior art, a supply medium transaction agreement is easily generated according to the invention between two entities without a central instance. In particular, instead of a central server or a platform, according to the present invention a peer-to-peer network (also called a framework) ensures the tamper-proof generation of a supply medium transaction agreement by means of a peer-to-peer application. In the case of a peer-to-peer network, high security standards are achieved in that all computers (peer nodes) in the network, at least a fraction of the peer computers in the network, monitor(s) and/or validate(s) the accuracy of supply medium transaction agreements. The transaction costs can be significantly reduced. No central, superior platform, server, cloud, etc. is required. In addition, by causing the generation of a supply medium transaction agreement based on supply medium offers and a subsequent control of the at least one supply medium unit based on said generated supply medium transaction agreement, a more efficient operation of the at least one supply medium unit is achieved.

According to the present invention, the control system comprises a forecast module. The forecast module is configured to generate a supply medium plan for a future time period for at least one supply medium unit. For instance, at least based on historical data related to the at least one supply medium unit, a respective supply medium plan can be created by the forecast module.

A supply medium plan may be an individual supply medium plan for a single supply medium unit or a group supply medium plan for a group (two or more) supply medium units. For example, a group supply medium plan can be created for all controllable and/or not controllable supply medium units of an entity. In one embodiment, a plurality of individual supply medium plans can be accumulated to a group supply medium plan.

The at least one supply medium unit is a supply medium consumer and/or supply medium producer and/or supply medium storage, which is connectable to the supply medium network. In other words, the least one supply medium unit can be configured to consume, produce and/or store supply medium. Thereby, a supply medium storage can store a supply medium by e.g. converting the supply medium into another medium or energy form. An example is a battery.

A supply channel network according to the present invention is arranged for transferring at least one supply medium between at least two entities connectable to the supply channel network. Examples of systems, particularly supply systems, which are not exhaustive, are electrical supply networks, gas supply networks, water supply networks and district heating networks.

Depending on the type of the supply system, electrical current or electrical power, water, such as fresh water, waste water or water for irrigation, gaseous media, such as natural gas or a similar (combustible) gas, heat, for example in the form of hot air, and/or cold, for example in the form of cold air, can be transferred or exchanged as a supply medium via a suitable physical, in particular grid-based, supply channel network.

A supply channel network may be at least in part a public supply channel network and/or at least in part private supply channel network. For example, the network may be a separate microgrid (only) for entities in the supply system or a virtual microgrid. It may preferably be a public network.

As described hereinbefore, the control system can be installed in an entity. An entity may be configured to exchange a supply medium with at least one further entity via the physical supply channel network. An entity may, for example, be a building, part of a building, such as an apartment, a single (intelligent) unit or machine, a business or the like. In one embodiment, the entity may comprise at least two sub-entities which can exchange a supply medium via an internal physical supply channel network.

In order to exchange a supply medium with a further entity, at least one supply medium offer message of another entity, preferably a plurality of supply medium offer messages e.g. of two or more further entities can be provided by the peer-to-peer application. A supply medium offer message can at least comprise information parameters about the supply medium quantity offered by the at least one further entity.

A peer-to-peer module of the control system is configured to read out data from the peer-to-peer application. A peer-to-peer module may be a computing device such as a computer, a mobile unit, a computing mechanism of another unit such as a television, a television set, etc., or at least part of one of these units. The peer-to-peer module may be a hardware and/or a software module.

The peer-to-peer module is configured to communicate with the peer-to-peer network, also called computer-computer network. In comparison to a client-server network in which a server provides a service and a client uses the service, these roles are cancelled in a peer-to-peer network. Each participant, such as a peer-to-peer module or peer computer, of the peer-to-peer network can use a service and the like and offer such a service. In particular, a peer-to-peer network is self-determined and/or self-organized (without any higher-level units). In the present case preferably each computer of the peer-to-peer network comprises a peer-to-peer application. In particular, the peer-to-peer module is configured to send messages to the peer-to-peer application and/or read data stored in the peer-to-peer application.

The peer-to-peer network is at least configured to store supply medium offer messages and to store and generate supply medium transaction agreements. The peer-to-peer application is characterized in that the peer-to-peer application or the data content of the peer-to-peer application is accessible preferably by all participants of the peer-to-peer network. It shall be understood that two or more, in particular different peer-to-peer applications can be provided by e.g. one or more peer-to-peer networks.

Based on at least one supply medium offer message and at least one supply medium plan the peer-to-peer module can cause the generation of at least one supply medium transaction agreement. A supply medium transaction agreement may, in particular, include data about the at least two participating entities, for example a unique ID and/or hash code, such as an entity address known to at least all participants of the peer-to-peer network, the quantity of a supply medium to be exchanged, the time period of the exchange and/or at least one transaction criterion. Through suitable checking and/or validation algorithms provided by the peer-to-peer application, such as digital signatures and/or hash functions, the accuracy and/or constancy of a generated supply medium transaction agreement can, in particular, be guaranteed by the cumulative processing power of the computers in the peer-to-peer network.

At least the peer-to-peer module of the control system is configured to cause or initiate generation of a supply medium transaction agreement between two entities, for example by transmitting a message comprising an instruction on the generation of the supply medium transaction agreement. The instructions are preferably based on the supply medium plan and the supply medium offer message. In particular, a suitable code and, where necessary, at least one key for verifying the sender of a message and/or the authenticity of a message can be transmitted to the peer-to-peer application or written in the peer-to-peer application by the communications device. Preferably following a confirmation message from the further entity comprising a suitable instruction and, where necessary, at least one key for verifying the sender of the confirmation message, a corresponding supply medium transaction agreement can be advantageously generated following a check by the peer-to-peer network of the peer-to-peer application. Expressed in simple terms, each entity can search for one or a plurality of suitable partners for the exchange of a supply medium by means of the peer-to-peer network or the peer-to-peer application and a supply medium transaction agreement can be generated by means of the peer-to-peer application.

The list of all participants or entities of the peer-to-peer network can preferably be made known to each participant, so in particular to each entity of a supply system, as an identifier, e.g. in the form of a communications address.

Following the generation of a supply medium transaction agreement, the supply medium can be exchanged accordingly between the entities, for example transferred from the first entity to the other entity or from the other entity to the first entity using the physical supply channel network.

Furthermore, based on the generation of a supply medium transaction agreement, the controlling module controls the at least one supply medium unit. E.g. based on the agreed time period and the agreed quantity of supply medium, the controlling module activates and/or deactivates a supply medium unit. The controlling module may be part of another device of a first entity or a standalone device.

According to a first embodiment of the control system of the present invention, the supply medium plan can be a supply medium consumption prediction for a future time period. In other words, a supply medium plan may be a consumption profile of at least one supply medium unit for a particular future time period, such as the following week, the following day, the following hour, etc. Alternatively or additionally, the supply medium plan may be a supply medium production prediction for a future time period. In other words, a supply medium plan may be a production profile of at least one supply medium unit for a particular future time period, such as the following week, the following day, the following hour, etc. A supply medium plan can preferably be created on the previous day in each case for the following day which can be divided into a plurality of sub-periods (e.g. 15-min intervals, in other words 96 sub-periods).

In a preferred embodiment of the control system the at least one supply medium unit may be a flexible supply medium unit. Flexible means that the supply medium has at least one adaptable operating parameter, wherein the operating parameter can be adapted at least within a predefined parameter range. For instance, one operating parameter may be the amount of supply medium which is consumed and/or produced per time. This operating parameter can be adaptable, e.g. it can be increased or reduced. Alternatively or additionally, the operating parameter may be an activation time period and/or the activation time point. Also this parameter can be adaptable. For instance, the activation time of a supply medium unit can be moved, shortened and/or enlarged. By way of example the at least one supply medium unit may be a flexible supply medium consumer and/or a flexible supply medium producer and/or a flexible supply medium storage. In dependence of the at least one flexible operating parameter a respective supply medium plan for a future period can be adapted/changed.

A supply medium plan can preferably be created for each entity comprising a control system. As described hereinbefore, a supply medium plan can comprise a forecast in particular for a plurality of supply medium units of a first entity for at least one future period of time in relation to the demand and/or supply of a supply medium. For example, the creation of the supply medium plan may be based on historic data relating to the past demand/supply of a supply medium, (external) forecast data such as weather data and/or user specifications, such as calendar data, an individual's stay (including a forecast of when residents return home and/or when a business starts processing), capacity data relating to a storage such as a battery, etc. The creation of a supply medium plan may, in particular, be configured by the entity, preferably a local application for communicating with the at least one peer-to-peer application. For example, in the case of a gas supply system the creation of the supply medium plan may be based on the historic consumption of gas by the entity. In addition, weather forecasts and temperature data, for example, can be taken into account. Similarly, with other kinds of supply systems, a supply medium plan can be created. Based on the supply medium plan, the peer-to-peer module of a control system can transmit a supply medium query or supply medium offer message to the peer-to-peer network, in particular to the previously described peer-to-peer application. Each entity or the peer-to-peer modules assigned thereto can preferably read the information transmitted.

Furthermore, according to a further embodiment, the at least one supply medium offer message can comprise at least one information parameter of the group of: supply medium quantity, a time period and at least one transaction criterion. A supply medium offer message may advantageously comprise at least all of the aforementioned data entries. In addition, a sender identifier, such as a unique address known to each participant in the peer-to-peer network, a time stamp, further transaction criteria, etc. may be included.

According to a particularly preferred embodiment, the control system may comprise at least one adapting module configured to adapt the supply medium plan of at least one flexible supply medium unit based on at least one information parameter of the at least one supply medium offer message. For instance, the supply medium plan can be adapted by adapting at least one flexible operating parameter of at least one flexible supply medium unit. For instance, if the offered amount of a supply medium for a particular future time period is (too) low, the planed activation, e.g. the respective operating parameter, of at least one supply medium unit can be shifted. Alternatively or additionally, the amount of supply medium which is planned to be consumed and/or produced and/or stored per time unit by the at least one supply medium unit can be adapted (e.g. increased or reduced). Another example may be that an offered transaction criterion, such as price data, are higher during a first future time period than during another future time period. Also in this case, the planed activation of at least one supply medium and/or the planed amount of supply medium which is consumed and/or produced and/or stored per time unit by the at least one supply medium unit can be adapted accordingly.

Preferably, the peer-to-peer module may be configured to cause generation of a supply medium transaction agreement about the physical exchange of a supply medium between the first entity and the further entity by means of the peer-to-peer application at least based on the adapted supply medium plan and the at least one supply medium offer message. The efficiency of the operation of the one or more supply medium units of an entity can be further improved. It shall be understood that the adaption of the supply medium plan is based on the at least one supply medium offer message.

According to a further embodiment, the adapting module can be configured to adapt the supply medium plan of at least one flexible supply medium unit based on at least predetermined specification. A predetermined specification may be a general rule. For instance, it can be specified that the at least one supply medium unit, preferably all supply medium units of an entity should be operated with low costs, and/or environmental-friendly. For instance, respective maximum transaction criteria can be predetermined. By way of example, a user of the entity can determine said at least one specification.

The adapting module may be preferably configured to perform an iterative optimization process in order to adapt (optimize) the at least one supply medium plan depending on the at least one supply medium offer message, the possible flexibilities in the supply medium plan and the at least one predetermined specification.

Furthermore, according to another embodiment, the control system may comprise at least one metering module configured to measure the quantity of supply medium transferred via a connection of the first entity with the physical supply channel network. Each entity may preferably have a corresponding metering module or at least be connectable thereto. A metering module may, in particular, be a smart meter, for example a gas meter, an electricity meter, a flow meter, etc. The quantity of supply medium can preferably be measured over time. This enables the quantity of supply medium transferred, that is fed in or removed, over a given time to be determined. The peer-to-peer module may be configured to transfer a measured supply medium quantity to the peer-to-peer application. For example, a communications link may be provided between the peer-to-peer module and the at least one metering module assigned to an entity. The peer-to-peer module can preferably transmit, depending on a supply medium transaction agreement, the supply medium quantity measured over the period of time specified in the agreement to the peer-to-peer application. The further entity can preferably measure the supply medium quantity in a corresponding manner and transmit it to the peer-to-peer application. A check of the information transmitted to the peer-to-peer application, in particular the quantity of supply medium actually supplied and/or received, can then be carried out by the peer-to-peer network, as described above, for example. The correct physical exchange of a supply medium can easily be guaranteed without a central instance. Tampering by an entity or by third parties can be prevented.

Preferably, the metering module may be configured to transmit the measured quantity of supply medium to a monitoring module. The monitoring module may be configured to compare the measured quantity of supply medium with the quantity of supply medium agreed in a supply medium transaction agreement. The monitoring unit can be coupled to the controlling module. In the case, the monitoring unit detects a deviation from an agreed supply medium transaction agreement the monitoring unit can forward this information to the controlling module. The controlling module may be configured to control the at least one supply medium unit depending on this information e.g. by reducing the supply medium quantity available for a particular supply medium unit. Other measures can be caused by the controlling module in order to at least reduce the deviation. In other words, a real-time monitoring can be provided.

In a preferred embodiment of a control system at least the controlling module is part of a home automation controller. The home automation controller may comprise a processor and storage means, such as a program memory and a main memory. The home automation controller may be configured to generate control signals in order to control the at least one supply medium unit. By way of example, the home automation controller can comprise an interface configured to wirelessly communicate with the at least one supply medium unit. It shall be understood that the controlling module can also be a part of or realized as an internal peer-to-peer network.

According to a preferred embodiment of the control system, the peer-to-peer application is a decentralized register. The decentralized register can be readable at least by a part of the participants of the peer-to-peer network. In particular, every computer node including the peer-to-peer module of the control system can comprise the peer-to-peer application. The decentralized register may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. In a simple way information can be made available to preferably all participants. This allows to carry out a review and/or validation of the information stored in the decentral register. Particularly preferably, each computer in the peer-to-peer network is configured to review new information, in particular based on older information stored in the peer-to-peer application.

Moreover, preferably each computer can in each case comprise the complete data content, but include at least a portion of the data contents of the peer-to-peer application, in particular of the decentral register. For example, it may be provided that after a positive verification of written information in the peer-to-peer application this information is saved by all computers, at least from a part of the computers. The tamper resistance of the data stored in the peer-to-peer application can thereby be further improved.

In a further embodiment, the peer-to-peer network is formed by a plurality of computer nodes and the peer-to-peer module of the control system is only configured to communicate with the plurality of computer nodes. In other words, the peer-to-peer module is not a computer node of the peer-to-peer network. Such a peer-to-peer module does not comprise the peer-to-peer application (itself) but only provides an interface module, such as an application programming interface (API), and a decentral application for communication with the computer nodes of the peer-to-peer network or the peer-to-peer application, such as a block chain. This allows reducing the required processing power of the peer-to-peer module.

In an alternative embodiment, the peer-to-peer network is formed by a plurality of computer nodes and the peer-to-peer module is one of the computer nodes. In this case, the peer-to-peer module comprises at least a part of the peer-to-peer application. For instance, the peer-to-peer module might be a so called light node. In particular, the peer-to-peer module can comprise preferably the total data content of the peer-to-peer application.

In order to store new information in a tamper-proof way, the peer-to-peer application can comprise encryption means and/or signature means and/or verification means, wherein at least one of the encryption means and/or signature means and/or verification means is configured to store at least the provided quantity parameter. At least one means of the aforementioned means may be adapted to store at least every provided quantity parameter. In particular it can be provided that by the hash function a link is established with at least one previously stored information in the decentral register. Alternatively, it can be provided that by the hash function a link is established with at least one de-central file system such as Interplanetary File System (IPFS). Further data, such as request messages, ordinary, contextual and/or transaction data of an entity can be stored.

Data of the peer-to-peer application can be either stored on the "decentral ledger technology" or the de-central ledger steers (encrypted) data storage accessible via the internet and preferably in de-central or P2P data storage entity such as Interplanetary File System (IPFS). This solution may enable to share data among a defined group of users or services. For instance, data can be shared for an optimization processes beyond the entity (i.e. many people sharing one battery or physical optimization of energy flexibilities through load shifting), for gamification, for additional services such as demand disaggregation which can use these data. Data can also be easily meshed with other context data in the peer-to-peer data store (e.g. calendar). A peer-to-peer file storage can also be used for deploying a software update for the peer-to-peer module. Data access may be fully controlled by the user.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the edges (always) have a (same) direction similar to time. In other words, it is not possible to step back. Eventually, acyclic means that loops do not exist.

In a particularly preferred embodiment of the control system, the peer-to-peer application can be a block chain comprising at least two interconnected blocks. The block chain technology or decentral ledger technology is already used in the payment by means of a crypto currency, such as Bitcoin. Block chain is a particular type of a DAG. It has been recognized that by a particular configuration of a block chain, at least the correctness of an generated supply medium transaction agreement can be checked without the need of a central server. In addition, the block chain can be used to provide supply medium offer messages in a tamper proof way. The block chain according to the present embodiment is particularly a decentralized, peer-to-peer-based register in which all measured supply medium parameters and preferably all supply medium transaction agreements and other messages sent be peer-to-peer modules can be logged. A block chain is particularly suitable as a technical means to replace a central entity in a simple and secure manner.

According to a further embodiment, at least one peer-to-peer file storage configured to store data may be provided. As described hereinbefore, the at least one peer-to-peer file storage may be an IFPS. Preferably, two or more peer-to-peer modules of respective entities can transmit data to or write data into the IFPS by means of the peer-to-peer application, in particular, a smart contract of the peer-to-peer application. The peer-to-peer application may run a commonly usable smart contract with a multi signature account. This smart contract can perform an optimization process for the plurality of entities based on the stored data. The result can be provided to the forecasting module or controlling module.

Another aspect of the present invention is a home automation controller comprising a previously described control system. Preferably, the forecast module, the peer-to-peer module and the controlling module can be implemented in a home automation controller, such as a SmartHome Controller. At least one supply medium unit can be controllable by the home automation controller.

A further aspect of the present invention is a supply system. The supply system comprises a first entity connectable to at least one physical supply channel network. The supply system comprises at least one further entity connectable to the physical supply channel network. The supply system comprises at least one peer-to-peer network configured to provide at least one peer-to-peer application. At least one of the entities comprises a previously described control system. The at least one other entity comprises at least one peer-to-peer module connectable to the peer-to-peer network.

Preferably, at least a first entity and a further entity can each at least be connected via a suitable connection to the physical supply channel network. The connection corresponds to the physical supply channel network and may be an electrical line or a fluid connection, for example. It shall be understood that a supply system can comprise three or more entities. A supply network in the present case should be particularly understood to mean a supply system in which at least one entity can produce the supply medium and preferably feed it into a line belonging to the physical supply channel network and at least one entity can received the supply medium from the line within the physical supply channel network and preferably consume it. With supply networks of this kind, it is desirable for the quantity fed in and the quantity removed to balance one another out. In particular, a supply channel network in the present case is characterized in that it has limited capacity.

A yet further aspect of the present invention is a method of operating a control system, in particular a previously described control system. The method comprises:
creating at least one supply medium plan of at least one supply medium unit of a first entity,
wherein the at least one supply medium unit is a supply medium consumer and/or supply medium producer and/or supply medium storage,
wherein the at least one supply medium unit is connectable to at least one physical supply channel network,
receiving at least one supply medium offer message of at least one further entity by communicating with at least one peer-to-peer application of at least one peer-to-peer network,
causing generation of a supply medium transaction agreement about the physical exchange of a supply medium between the first entity and the further entity by means of the peer-to-peer application at least based on the supply medium plan and the at least one supply medium offer message, and
controlling the at least one supply medium unit in dependence of the generated supply medium transaction agreement.

The method can be a computer program comprising instructions for causing a processor to operate a control system as described above.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit the measured quantity parameter to the peer-to-peer application via the API. The decentral application is at least configured to process and transmit the meter data.

Preferably, the data can be transmitted via a cryptographically secured tunnel to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

It is also noted that at least two entities may be sub-entities within a (main entity). E.g. a machine of an entity and a producer of said entity can be provided. In this case, the physical supply channel network may be formed by at least one internal supply channel.

The features of the methods, systems or networks, devices and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

BRIEF DESCRIPTION OF THE SEVERAL VIEWS OF THE DRAWING

In the figures show.

DETAILED DESCRIPTION OF THE INVENTION

Figure 1:
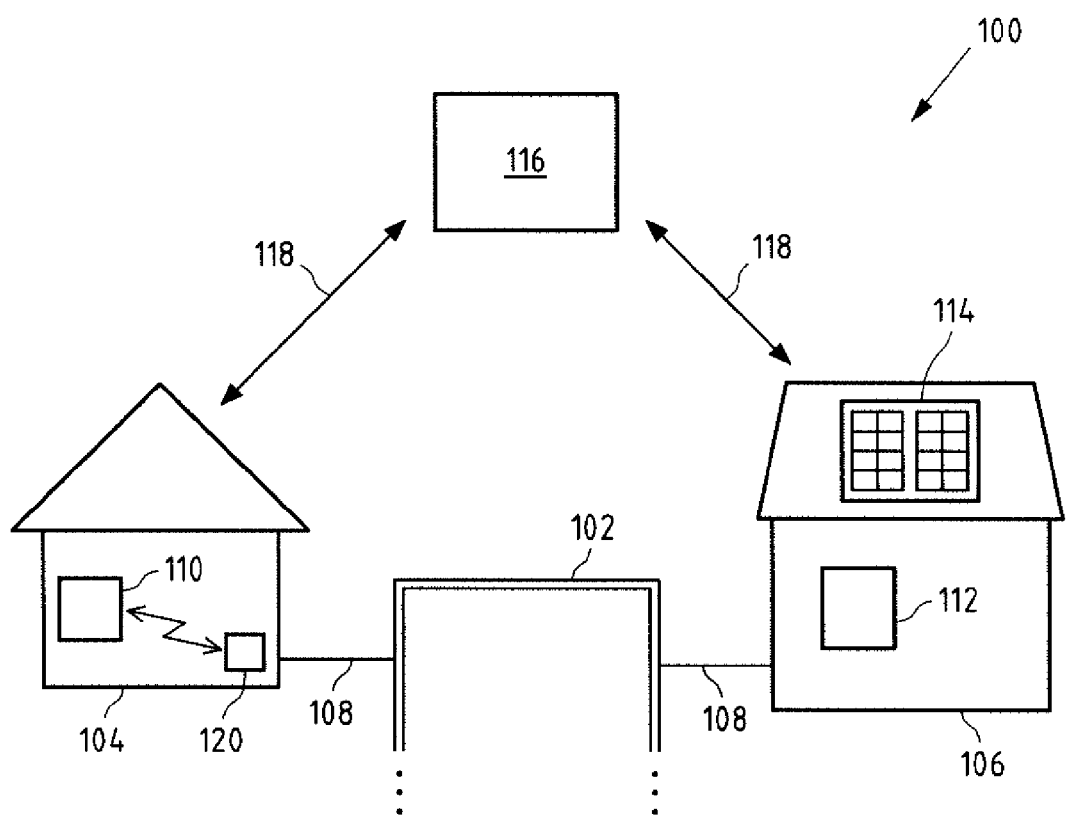
FIG. 1 shows a schematic view of an exemplary embodiment of a supply system according to prior art.

Like reference numerals in different figures indicate like elements.

Figure 2:
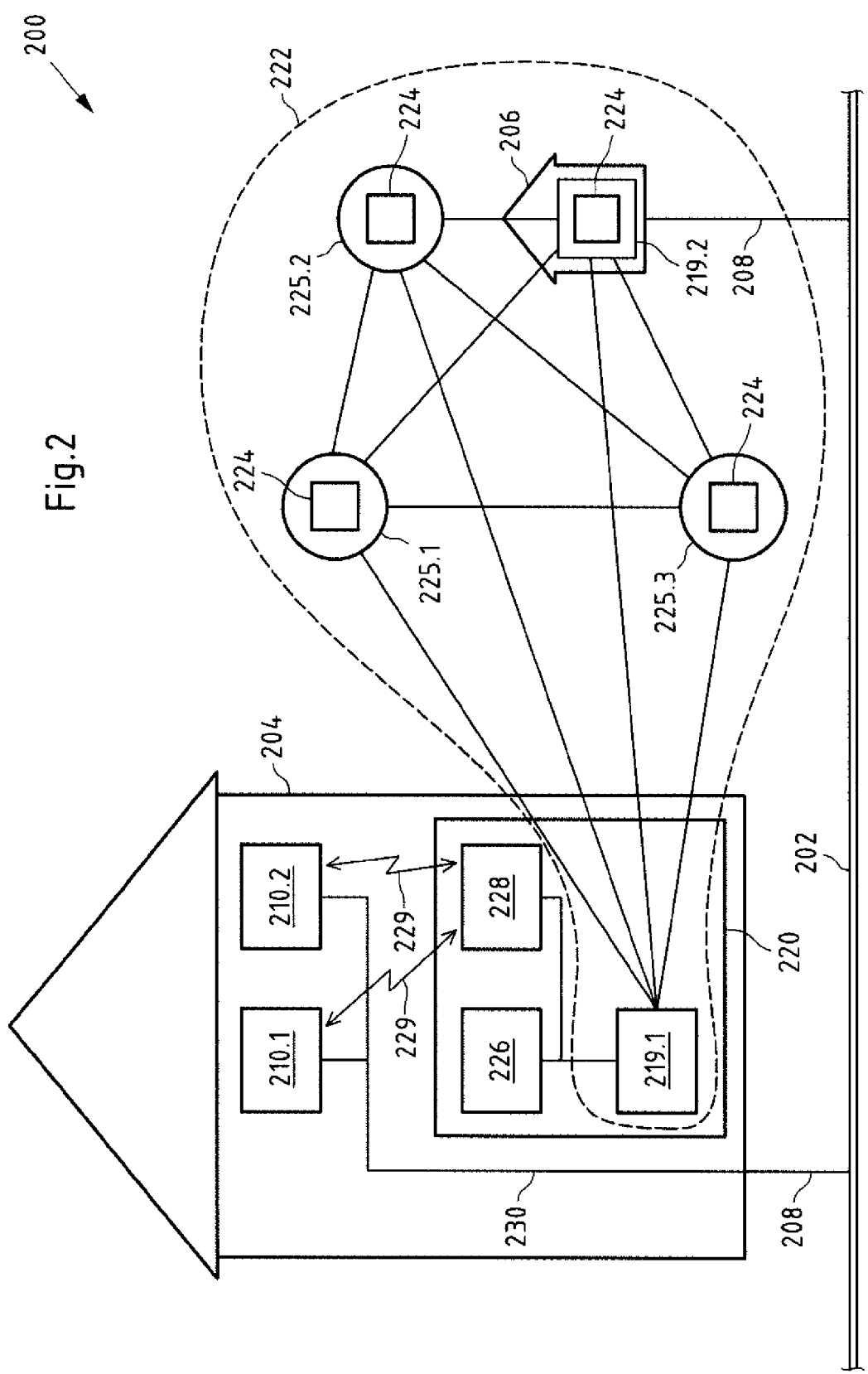
FIG. 2 shows a schematic view of an exemplary embodiment of a supply system according to the present invention.

FIG. 2 shows a schematic view of an exemplary embodiment of a supply system 200 according to the present invention. The depicted supply system 200 comprises an embodiment of a control system 220 according to the present invention. It shall be understood that the supply medium units 210.1, 210.2 can be part of the control system.

The supply system 200 may be an electrical supply network, a gas supply network, a water supply network or a district heating network.

The present system 200 comprises by way of example a first entity 204 and a further entity 206. It shall be understood that more than two entities 204, 206 can be provided. An entity 204, 206 may be a building, a household, a plant or machine, an electronic unit, etc. For instance, an entity might be a supply medium unit provided with a control system configured to control the at least one supply medium unit, such as an electronic unit.

In addition, as can be seen from FIG. 2, each entity 204, 206 comprises at least one connection 208 configured to connect the entity 204, 206, in particular the respective supply medium units 210.1, 210.2, to a supply channel network 202. The connection 208 may be disconnectable, for example by a switch, a valve, etc. A supply medium unit 210.1, 210.2 can be connected via an internal supply medium network 230 to the connection 208.

A supply medium unit 210.1, 210.2 can be a supply medium consumer, a supply medium producer or a supply medium storage. A supply medium consumer is a unit which consumes supply medium during its operation. A supply medium producer is a unit which produces or provides supply medium during its operation. By way of an exemplified electrical supply system, examples of electrical consumers may be refrigerators, lighting systems, televisions, computers, washing machines, kitchen appliances, etc. Examples of electrical producers are photovoltaic devices, micro-wind turbines, CHP (combined heat and power), etc. An example of an electrical storage unit may be a battery.

The type of supply channel network 202 depends on the type of supply system 200. In a gas supply network 200 the network 202 may be a pipeline network 202 for gas, for example. Correspondingly suitable connections 208 may be provided for an electricity network, a water network of a district heating network. It shall be understood that an entity 204, 206 may be part of more than one supply system 200.

A substantial difference compared with a prior art system, such as system 100 according to FIG. 1, is that no central instance is provided. In the present case, the system 200 has a peer-to-peer network 222 or a computer-computer network 222. The peer-to-peer network 222 comprises a plurality of nodes 225.1 to 225.3 or computers 225.1 to 225.3. A peer-to-peer network 222 is characterized in the present case in that each node and/or participant is preferably connected to every other node and/or participant. In addition, the computers have equal rights, something which distinguishes them from a server-client structure.

The three depicted nodes 225.1 to 225.3, for example computers 225.1 to 225.3, (each) comprise a peer-to-peer application 224. As can be seen, the same peer-to-peer application 224 is implemented on each node 225.1 to 225.3. The peer-to-peer application 224 may preferably be a public and/or decentral register 224 that can, in particular, be inspected by all participants (not only the node) of the peer-to-peer network 222. Each node 226.1 to 226.3 preferably has the (entire) public register 224. It may also be envisaged that only part of the register is provided on a node. In a particularly preferred embodiment, the peer-to-peer application 224 may be a block chain 224.

It shall be understood that the decentral register can be a private, consortium or public block chain. In other words it can be a permissioned or a permissionless block chain.

In an implementation of the peer-to-peer network or the block chain there may be only one validating peer or full node and one or more observing nodes that can validate transactions to establish a trust level but do not validate all transactions which is done by the validating peer (e.g. Open Chain).

Furthermore, the first entity 204 comprises a control system 220. In the present example, the control system 220 comprises three modules 219.1, 226 and 228. In particular, the control system 220 comprises a forecast module 226. The forecast module 226 can be configured to create at least one supply medium plan for at least one supply medium unit 210.1, 210.2. By way of example, based on historical supply medium data of the supply medium units 210.1, 210.2, the forecast module 226 may create a (single) group supply medium plan for the group of supply medium units 210.1, 210.2 for a future period. A detailed description will follow. It is noted that the forecast module can be module of the entity 204 and/or can also be arranged at least in part remote from the entity. For instance, the forecast module may be formed by a cloud.

Furthermore, the control system 220 comprises a controlling module 228 for controlling the supply medium units 210.1, 210.2. The controlling module 228 can be at least configured to activate and deactivate the supply medium units 210.1, 210.2. The controlling module 228 may generate respective controlling signals.

In addition, it can be seen that in the present case each entity 204, 206 has a peer-to-peer module 219.1, 219.2. A peer-to-peer module 219.1, 219.2 is configured to communicate at least with the peer-to-peer network 222, i.e. the nodes 225.1 to 225.3. In other words, the peer-to-peer module 219.1, 219.2 or the entity 204, 206 corresponding to this peer-to-peer module 219.1, 219.2 is at least a participant of the peer-to-peer network 222. In this case, all participants of the peer-to-peer network 222 are preferably known to each participant of the peer-to-peer network 222.

In the present case, the further peer-to-peer module 219.2 is a node or computer in the peer-to-peer network 222. Hence, the peer-to-peer module 219.2 likewise comprises the peer-to-peer application 224. The peer-to-peer module 219.1 (only) comprises a decentral application and an API in order to communicate with the peer-to-peer application 224.

The peer-to-peer module 219.1 is configured to receive and read, respectively supply medium offer messages stored in the peer-to-peer application 224. Furthermore, the peer-to-peer module 219.1 is configured to cause the generation of a supply medium transaction agreement based on the created group supply medium plan and the read supply medium offer messages.

In the present case, a supply medium transaction agreement about the exchange of a supply medium between the entities 204, 206 can be generated by means of the peer-to-peer application 224 in a tamper-proof manner. For this purpose, each peer-to-peer module 219.1, 219.2 can communicate with the peer-to-peer application 224, in order to cause the generation of a supply medium transaction agreement. The supply medium, such as electrical current or electrical power, water, such as fresh or waste water, gaseous media such as natural gas or a similar (combustible) gas, heat, for example in the shape of hot air, and/or cold, for example in the form of cold air, can then be transferred according to the generated agreement.

Furthermore, according to the generated agreement, the controlling module 228 can control the supply medium units 210.1, 210.2. By way of example, based on the generated agreement, a supply medium control plan comprising controlling data can be generated. Then, the controlling module 228 may use this controlling data to control the supply medium units 210.1, 210.2.

The exemplary embodiments below relate to an improved demonstration of a supply system in the form of an electrical power network. The invention is not limited to this, however. In particular, the following embodiments can be translated to other supply systems or networks, such as gas supply networks, water supply networks or district heating networks.

Figure 3:
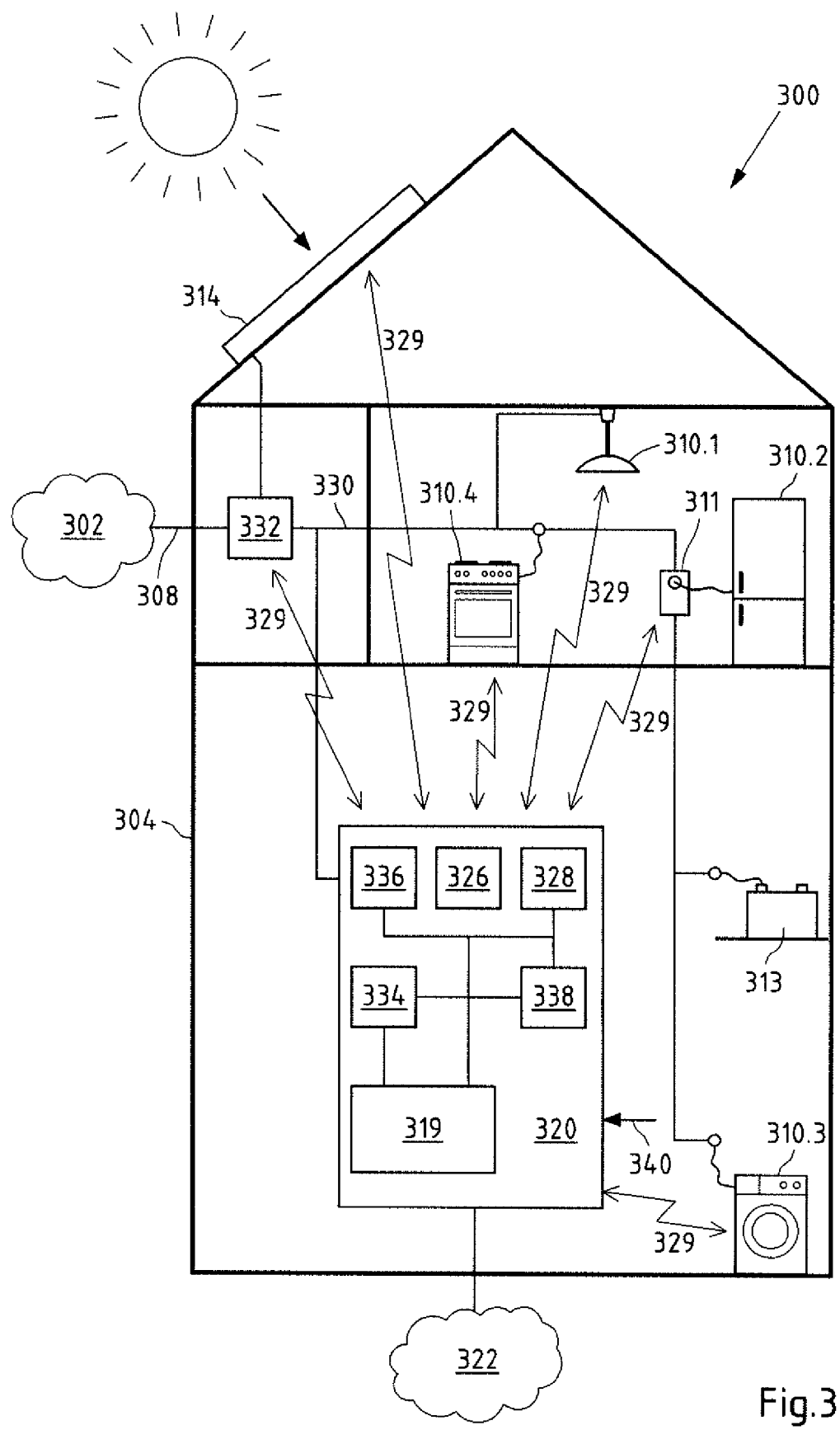
FIG. 3 shows a schematic view of an exemplary embodiment of a control system according to the present invention.

FIG. 3 shows a further embodiment of a supply system 300 according to the present invention comprising a further embodiment of a control system 320 of the present invention.

In the present example, the entity 304 may be a building 304 or household 304. The entity 304 can be connected to a supply channel network 302 via a connection 308. The supply channel network 302 may be an electrical current network 302 comprising electrical energy lines, transformers, etc.

Moreover, in the present exemplary embodiment, an internal power circuit 330 or internal mains 330 of the entity 304 is connected via the connection 308 to the public or private electricity network 302. Furthermore, the depicted entity 304 comprises a plurality of electrical supply medium units 310.1 to 314. By way of example, a washer 310.3, a stove 310.4, a lamp 310.1 and a fridge 310.2 are provided. The control system 320 in form of a home automation controller 320 and the electrical consumers 310.1, 310.2, 310.4 are directly connected to the internal power circuit 330. The refrigerator 310.2 is connected via an intermediate connector device 311 to the internal power circuit 330.

The intermediate connector device 311 is, for example, inserted in a socket of the internal power circuit 330. It can include a socket for receiving a plug of the refrigerator 310.2 so that the intermediate connector device 311 is intermediately connectable into the power supply of the refrigerator 310.2.

The internal power circuit 330 is connected via at least one metering module 332 to the electrical supply channel network 302. Also located in the entity 304 is a photovoltaic device 314, which is connected via the metering module 332 to the internal power circuit 330 and the supply channel network 302. The electrical power produced or generated by the photovoltaic device 314 is consumable by the electrical consumers 310.1 to 310.4. In addition, the electrical power produced can be fed into the supply channel network 302. In another embodiment, the electrical power produced may be stored into a battery 313 and/or another (not shown) storage. In one embodiment, the storage may be a water tank for storing heat water or the like.

The electrical consumers 310.1 to 310.4 are connected via respective radio links of a radio network 329 with the home automation controller 320. The electrical consumers 310.1 to 310.4 can be at least switched on and off by the home automation controller 320 or lead controller. It shall be understood that according to other variants, at least a part of the connections 329 may be wired connections.

In addition, home automation interfaces of electrical consumers 310.1 to 310.4 can detect the current power requirement and send the detected power demand data over the wireless network 329 to the home automation controller 320. The photovoltaic device 314 is connected via the radio link 329 with the home automation controller 320, for example, by a suitable home control interface. For example, the home automation controller 320 can control, whether the power generated by the photovoltaic device 314 is at least partially provided in the internal power circuit 330, whether the power is at least partly used to charge a battery 313 and whether the power is at least partly fed into the electrical supply channel network 302. Furthermore, the home automation controller 320 can control whether stored energy in the battery 313 is provided e.g. to the internal power circuit 330. In addition, the photovoltaic device 314 may detect the power supplied by the photovoltaic device 314 and may send the collected power data over the wireless network 329 to the home automation controller 320.

The meter 332 is connected via the radio link 329 with the home automation controller 320. The meter 332 may measure the power transmitted via the connection 308 per time unit. The actual power demand of electrical consumers 310.1 to 310.4 and the power supplied from the photovoltaic device 314 can be measured. The measured data can be collected and send via the radio link 329 to the home automation controller 320.

The depicted home automation controller 320 comprises a peer-to-peer module 319, a forecast module 326, a controlling module 328, a monitoring unit 336, an adapting unit 334 and a database 338. It shall be understood that at least some of the modules, such as a database 338, can be separate devices, which are connected to the home automation controller 320.

It shall be understood that the database 338 can be a peer-to-peer file system such as an IPFS.

Data stored in the peer-to-peer file system can be made accessible via multi-signature accounts to a defined group of users or services. This solution enables services and optimisations beyond the single entity. For instance, such an implementation would enable to share data among a defined group of people or services. Data access may be fully controlled by the user. By means of the IPFS, data can be used for optimization processes beyond the entity (i.e. many people sharing one battery or physical optimization of energy flexibilities through load shifting), gamification and/or additional services such as demand disaggregation which can use this data. Data can also be easily meshed with other context data in the peer-to-peer data store (e.g. calendar). The Peer-to-peer file storage can also be used for deploying a software update for the peer-to-peer module.

Furthermore, the home automation controller 320 comprises at least one further interface 340. The at least one further interface 340 may be a user interface (e.g. smart phone or in-home visualisation device) and/or a network interface to a network, such as the internet. For instance, data from external data sources, such as weather data sources, etc., can be received by the home automation controller 320 via the further interface 340.

As described hereinbefore, the peer-to-peer module 319 is configured to communicate with a peer-to-peer network 322 providing a peer-to-peer application (not shown).

The database 338 can be in particular configured to store the power data detected by and sent from the supply medium units 310.1 to 312. The forecast module 326 can create (initial) individual and/or group supply medium plan/s based on historical power data stored in the database 338.

The adapting module 334 is configured to adapt, in particular, optimize the (initial) individual and/or group supply medium plan/s. Furthermore, by means of the peer-to-peer module 319, information about supply medium offer messages stored in the peer-to-peer application is provided to the adapting module 334. Based on this information, the at least one supply medium plan can be adapted by the adapting module 334. Preferably, the supply medium plan can be adapted by changing planned but flexible operating parameters of flexible supply medium units. By way of example, the washer 310.3 is a flexible electrical consumer 310.3. For example, a flexible operating parameter is the activation time of a washing cycle (e.g. between predetermined minimum and maximum time limits). Also the refrigerator 310.2 is a flexible consumer 310.2. For instance, in order to maintain a minimum cooling temperature, the refrigerator 310.2 may be activated within a predetermined time frame or window. This operating parameter, i.e. activation start time, may be flexible in particular limits. In addition, it may be possible that at least one of the consumers is flexible regarding the required power. For instance, for reducing power the washer can be operated with a saving wash cycle (e.g. 30° C. instead of 60° C.). Also the stove 310.4 may be operated with reduced power.

Based on these flexibilities, the information of supply medium offer messages and e.g. user specifications input e.g. via the interface 340, the at least one supply medium plan can be adapted by the adapting module 334. The adapting or optimizing process may be a iterative process.

The peer-to-peer module 319 may cause generation of a supply medium transaction agreement at least based on the at least one adapted supply medium plan. Then, the controlling module 328 can control the (controllable) supply medium units 310.1 to 314 based on the generated agreement.

Furthermore, the monitoring module 336 can be configured to compare the power data measured and provided by the metering module 332 with the agreed power data of a supply medium transaction agreement. If the monitoring module 336 detects a deviation, the monitoring module 336 can inform the controlling module 328 accordingly. A deviation may e.g. occur if not all supply medium units are controllable by the controlling module 328. In dependence of the detected deviation, the controlling module 328 may control at least one of the supply medium units 310.1 to 312 such that the deviation is at least reduced.

In addition, it should be pointed out that in an advantageous embodiment data, such as weather forecasts and/or market data, can be made available to each peer by a so called feed from the peer-to-peer application (or so called smart oracle). For example, the participants may have agreed on one or a plurality of weather data suppliers. In this case, the at least one weather data source may transmit the weather forecast data to the peer-to-peer application. The weather source may have been validated by at least part of the peer. The same weather data are then preferably made available by means of the peer-to-peer application to each peer. It shall be understood that a supply medium plan for an entity can be created based on other weather data.

It shall be understood that the home automation controller comprises suitable means (e.g. processor, microprocessor, memory means, etc.) for processing the data and for generating suitable signals.

Figure 4:
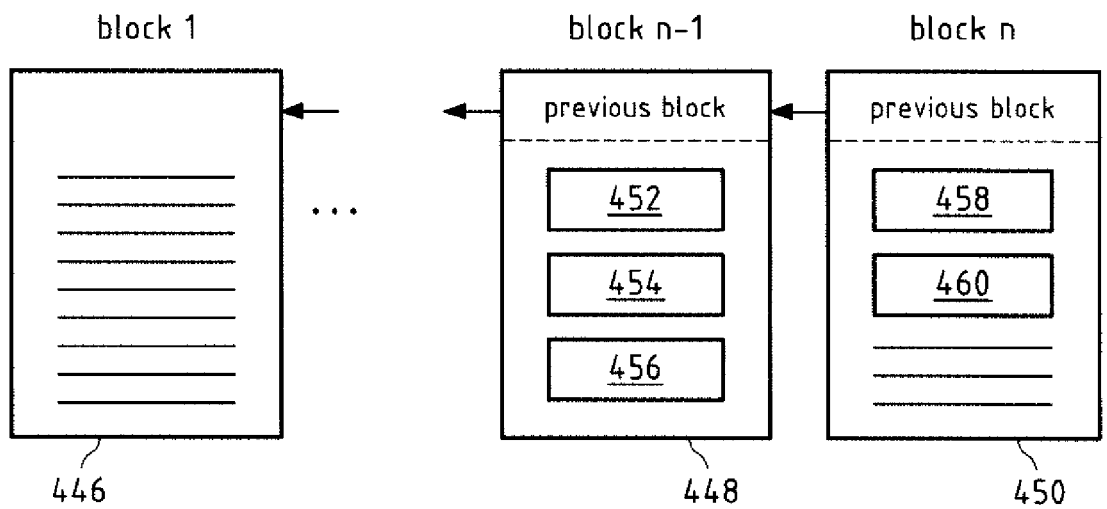
FIG. 4 shows a schematic view of an embodiment of a peer-to-peer application according to the present invention.

FIG. 4 shows a schematic view of an exemplary embodiment of a peer-to-peer application 424 according to the present invention. The peer-to-peer application 424 is, in particular, a register that can be inspected/visible by participants of a peer-to-peer network 424. Messages can be written into the register and/or read out by peer-to-peer modules of the peer-to-peer network. In a preferred exemplary embodiment, the peer-to-peer application 424 may be a block chain 424.

In the more detailed description of the present exemplary embodiment below, it is assumed that the peer-to-peer application 424 is a block chain 424. However, the following embodiments can easily be translated to other peer-to-peer applications.

The block chain 424 is formed from at least one block 446 to 450, preferably a plurality of blocks 446 to 450 connected to one another. The first block 446 may also be referred to as the genesis block 446. As can be seen, a block 448, 450 (except for the first block) relates to the preceding block 446, 448 in each case. A new block may be created by a computing-intensive process (by mining or a corresponding process, for example) and, in particular, provided to all participants in the peer-to-peer network.

The present block chain 424 is particularly configured to receive messages from a peer-to-peer module of e.g. a control system, wherein the peer-to-peer module is at least a participant of the peer-to-peer network. The block chain 424 is configured to store these messages in the block chain 424. In particular, a new message in the current block 450 of the block chain 424 can be saved and published. Due to the configuration of a block chain 424 as a public register 424, the message of a peer-to-peer module can be read by preferably all participants of the peer-to-peer network.

In the present block chain 424, different kinds of messages/data can be processed and/or stored within a smart contract (algorithm and/or store on the block chain), for example. The message 452 may be a query message 452 or supply medium offer message 452, for example. A supply medium offer message 452 is characterized in that it can comprise the following information parameters:

Quantity specification (supply medium quantity): amount of supply medium, which is desired or made available by an entity Time indication (time period): future period, at which the desired supply medium amount is desired or provided Transaction criterion: criterion that must be met by another entity to complete a supply medium transaction agreement about the specified amount and period It shall be understood that other transaction criteria can be defined. Furthermore, the supply medium offer message 452 may comprise more information. More information can be, for example, a time stamp, a signature of the sender of the message, a message ID of the transaction and other transaction criteria, such as an indication of the desired production or consumption type, distance to the entity, etc.

Another message 454 may be an acceptance message 454. An acceptance message 454 may comprise identical or at least similar data details as compared with a supply medium offer message 452. Additionally, the acceptance message 454 can comprise a reference indication to a previous request, such as the ID of the supply medium offer message 454. For example, it can be listed in an acceptance message 454 in relation to a supply medium offer message 452 that a certain and desired amount of supply medium can be delivered for the future period in accordance with the transaction criterion. The amount may be a sub-amount of the requested quantity. The specified time may also be a part-time or sub-time. It can also be given a lower/higher transaction criterion.

If an acceptance message 454 includes only a sub-quantity of the requested quantity, a part-time indication and/or a lower, higher or other transaction criterion, the acceptance message 454 can be called a counter-offer message 454. This can be accepted by the entity which has provided the supply medium offer message 452 through an acceptance message. Based on this, the entity, e.g. the peer-to-peer module, may cause the generation of a supply medium transaction agreement.

In particular, there can be multiple request messages and/or accepting messages and/or messages comprising a delivered/consumed quantity parameter of a supply medium of a particular period. Each entity can give guidelines, according to which at least one supply medium transaction agreement can be generated. In a preferably automated, such as iterative process, each request message can be associated to an optimally corresponding acceptance message. The block chain 424 may also be configured to generate, based on the messages of at least one peer-to-peer module, a supply medium transaction agreement 456.

A supply medium transaction agreement 456 may be stored in a block 448 within a smart contract 456. A smart contract may comprise a computer program code. In the supply medium transaction agreement, the exchange and supply or receipt of a given quantity of the supply medium for a given period of time and/or a transaction criterion, such as a given price, may be agreed between the first entity and a further entity. For example, the first entity may cause with the further entity by means of the block chain the generation of an agreement that the first entity supplies the further entity for a period of time $T_x$ and an amount X with a given quantity of electrical power (X kW/h) via the electricity network. Corresponding supply medium transaction agreements can be generated in other supply systems.

In addition, a transaction criterion transaction 458, such as the transaction of a previously agreed amount of a cryptocurrency following fulfilment of the supply medium transaction agreement, can be stored in a block 450. For this purpose, the corresponding meter data 460 of the entities can be stored. E.g. during the time $T_x$, the meters of the involved entities measures the power flow and transmits the actual exchanged amount X of power of the period $T_x$ to the block chain 424, which saves the messages 460, e.g. X kW/$T_x$ h (and additional data, such as transaction ID, entity ID, and the like). Preferably, each of the involved entities transmits the respective data via their associated meters to the block chain. The meter data stored in the block chain 424 can then be checked and verified by the peer-to-peer network, in particular, the participants of the peer-to-peer network. After a positive verification of the meter data, an agreed transaction criterion transaction 458 can be generated and performed by means of the block chain 424. For instance, an agreed amount of a crypto currency can be transferred. Also this can be verified by the peer-to-peer network, in particular, the participants of the peer-to-peer network.

In particular, the peer-to-peer application 424 is configured to save the messages 452 to 460 in a tamper-proof manner. This is done essentially by the fact that through the entire peer-to-peer network, for example, a supply medium transaction agreement can be verified by the cumulative calculation power of the entire peer-to-peer network.

Preferably, at least the above-described messages, such as the supply medium transaction agreements and meter data messages, can be hashed together in pairs in a block of the block chain by a Merkle tree. In particular, only the last hash value, the so-called root hash, is noted as a checksum in the header of a block. Then, the block can be coupled with the previous block. Chaining of the blocks can be performed using this root hashes. Each block can include the hash of the entire previous block header in its header. This makes it possible to clearly define the order of the blocks. In addition, this may also prevent the subsequent modification of previous blocks and the messages stored in the previous blocks, since in particular the hashes of all subsequent blocks would have to be recalculated in a short time.

Figure 5:
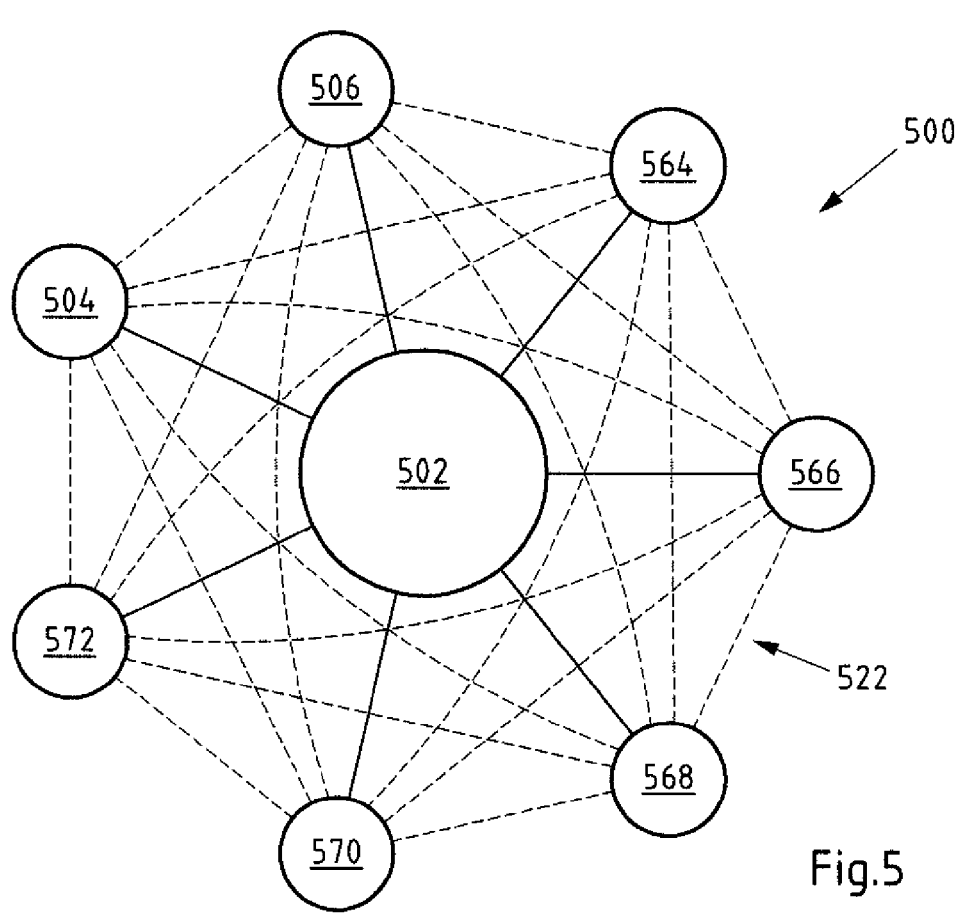
FIG. 5 shows a schematic view of an embodiment of a supply system according to the present invention.

FIG. 5 depicts a schematic view of a further exemplary embodiment of a supply system 500, in particular an electrical supply system 500. The supply system 500 depicted in a greatly simplified form comprises seven entities 504, 506, 564 to 572 in the present case. All entities 504, 506, 564 to 572 can at least be connected to a supply channel network 502, in particular an electricity network 502. In the present example, each entity 504, 506, 564 to 572 can comprise a peer-to-peer module. In particular, at least one of the entities 504, 506, 564 to 572 comprises a control system, as described hereinbefore.

As can further be seen, the entities 504, 506, 564 to 572 or the respective peer-to-peer modules (not shown) create a peer-to-peer network 522 which provides a peer-to-peer application (not shown), e.g. the block chain 424 according to FIG. 4.

The first entity 504 may be a household 504 which comprises a plurality of electrical consumers. The first entity 504 may therefore also be referred to as an electrical consumer 504. The first entity 504 therefore has a demand for the supply medium and can generate corresponding supply medium offer message and/or acceptance messages and also transmit them to the peer-to-peer network 522. The further entity 506 may likewise be a household 506, in particular a prosumer 506. As the prosumer 506, the other entity can deliver power to the electricity network 502 and also receive power from the electricity network 502. The prosumer may generate corresponding supply medium offer message and/or acceptance messages and transmit them to the peer-to-peer network 522.

The further entity 564 may be a decentralized producer 564, such as a wind turbine 564. In other words, the entity 564 is configured to feed power into the electricity network 502. It may generate corresponding messages and also the following entities may generate corresponding messages. Moreover, an electrical storage 566, such as a battery 566, may be present as the entity 566. The storage 566 may be particularly configured, due to overcapacity in the electricity network 502, to store the overcapacity temporarily and deliver it again when there is a demand for power. In addition, an entity 568 may be an electrically operated machine 568, so, for example, a (smart) electrical consumer 568, such as an IoT device. The entity 570 may be a business 570, for example, with a plurality of electrical consumers and/or with one or a plurality of producers. Finally, a further household 572 may be provided as the entity 572.

Figure 6:
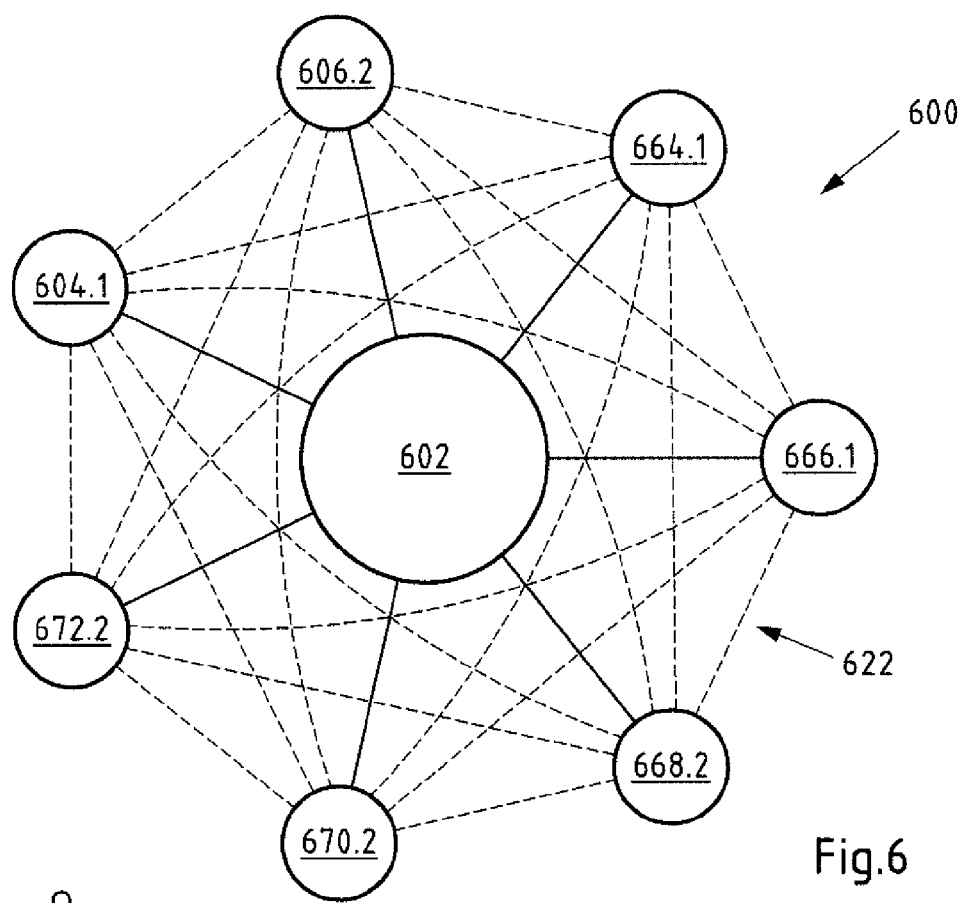
FIG. 6 shows a schematic view of a further embodiment of a supply system according to the present invention.

FIG. 6 shows a schematic view of a further exemplary embodiment of a system 600, in particular an electrical supply system 600. Only the differences compared with a supply system 500, such as the one depicted by way of example in FIG. 5, are described below. It should be pointed out that the entities 604.1 to 672.2 may be the same, similar or different entities as/to/from the previously described entities.

Unlike in the previous example, in the present case two different kinds of peers or node computers 604.1, 664.1, 666.1 or 606.2, 668.2, 670.2 and 672.2 are depicted. All peers 604.1 to 672.2 are included in the peer-to-peer network 622. In the present exemplary embodiment, however, only some of the peers 604.1 to 672.2, in the present case peers 604.1, 664.1, 666.1, check the validity of the messages stored in the peer-to-peer application, such as supply medium transaction agreements. It may also be provided that only some of the peers store the entire peer-to-peer application and/or only some of the peers execute the algorithms of the smart contracts. Since validation can involve a substantial amount of computational work, it may be advantageous for efficiency reasons for only some of the peers 604.1, 664.1, 666.1, in particular particularly powerful peers 604.1, 664.1, 666.1, to perform the validation. Powerful refers in particular to high processing power. In other words, in the present case a valid entry in the peer-to-peer application, such as a block chain, is assumed, if (only) some of the peers 604.1, 664.1, 666.1 have achieved a positive outcome. It goes without saying that a single peer, in particular an especially powerful peer, can also perform the validation alone.

Likewise, it may be provided in an alternative embodiment (not shown) that a particularly large peer-to-peer network can be divided into two or more clusters. With a corresponding peer-to-peer network, validation can only be carried out by the members of a cluster, for example.

In an implementation of the peer-to-peer network or the block chain there may be only one 'validating peer' or full node and one or more 'observing nodes' that can validate transactions to establish a trust level but do not validate all transactions which is done by the validating peer (e.g. Open Chain).

Figure 7:
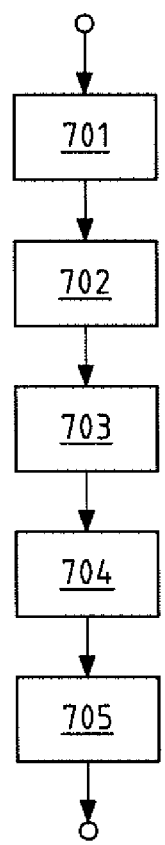
FIG. 7 shows a diagram of an embodiment of a method according to the present invention.

FIG. 7 shows a diagram of a first embodiment of a method according to the present invention. In a first step 701, by means of a forecast module, at least one supply medium plan for at least one supply medium unit, preferably for all supply medium units of an entity, can be created.

The creation of a supply medium plan may be based on historical data, user inputs and/or forecast data, such as weather data, market data, personal data and calendar data. For example, the current parameters measured can be transmitted by one or a plurality of current meters via communications connections to the monitoring module of the control system. These data can be stored in a database. For instance, the monitoring module may be configured to store the received current parameters in a database. The transmitted parameters may, in particular, be provided with a time stamp. For example, the consumption and/or producer parameters measured can be provided with a date and/or time. In this way, the profile of the power consumption/ production can be reproduced for previous periods of time. The at least one historic profile of at least one supply medium unit can then be used by the forecast module to create the at least one supply medium plan.

In particular, the supply medium plan can be prepared from this historical data and preferably additional forecast data, such as weather data and/or user data, such as times of absence, for a future period of time, such as the following week, the following day, the following hour, etc. A supply medium plan can preferably be created on the previous day in each case for the following day which can be divided into a plurality of sub-periods (e.g. 15-min intervals, in other words 96 sub-periods).

In addition to the supply medium plan, at least one transaction criterion may be specified for each sub-period. For example, two or more transaction criteria may be specified per sub-period, which criteria may fall between a maximum criterion and a minimum criterion, such as a maximum price and a minimum price. The advantage of specifying a period is that it is possible to react flexibly and at the same time optimally to the supply medium offer message from at least one other entity. The best possible offer from the point of view of the entity based on the independently set criteria may, in particular, be determined and selected in an automatic, iterative process. A preferred producer type, local proximity to the entity, etc. may also be specified as the transaction criterion, for example.

In a next step 702, the peer-to-peer module of the control system can receive or read out preferably all (current) supply medium offer messages stored in the peer-to-peer application.

Depending on the received supply medium offer messages, in particular, the information parameters, such as the supply medium quantity, time indication and/or transaction criterion, the supply medium plan can be adapted in step 703. For example, if a transaction criterion, such as a price, is high for a particular time period, the power needed by an entity during this time can be reduced, for instance, by moving the activation time/s of electrical consumers, such as a washer, and/or of own production units, such as CHP. Furthermore, the power fed into the supply medium channel network can be increased, for instance, by feeding power of a battery to the supply medium channel network.

Based on the adapted supply medium plan, and thus, based on the initial supply medium plan and the at least one supply medium offer message, the peer-to-peer application can cause the generation of a respective supply medium agreement by means of the peer-to-peer application (step 704). For instance, the peer-to-peer module can send an acceptance message to the peer-to-peer application comprising a reference to the supply medium offer message of another entity. As described hereinbefore, this (steps 702, 703) may be an iterative process In the next step 705, the controlling module can control the supply medium units based on the agreed supply medium plan. At the same time, the agreed amount of supply medium can be exchanged via the physical supply medium channel network.

In order to verify messages, public and/or private keys of entities can be used.

It shall be understood that the steps can at least partly be performed in parallel. For instance, the reading of supply medium offer messages and the creation of supply medium plans can be conducted in parallel manner.

Figure 8:
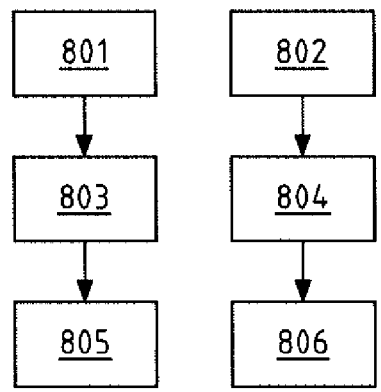
FIG. 8 shows a diagram of a further embodiment of a method according to the present invention.

FIG. 8 shows a further exemplary embodiment of a method according to the present invention. In particular, the method may be implemented when the exchange of the supply medium according to a supply medium transaction agreement has already taken place.

In a first step 801, a power quantity received during the time period $T_x$ can be provided to a first entity, in particular, the peer-to-peer module of the first entity. The power quantity can preferably be measured and provided by a metering module. The metering module can measure the electrical power (X kW/h) obtained from the electricity supply channel network, at least during the period of time $T_x$. Preferably parallel to this, in a step 802 a power quantity supplied during the time period $T_x$ may be provided to a further entity, in particular the peer-to-peer module of the further entity. For example, this also takes place by means of a metering module, as previously described.

In steps 803 and 804, it can be checked by means of the peer-to-peer application in each case whether the supply medium quantity has been exchanged in accordance with the supply medium transaction agreement between the first and the further entity. For example, the measured power quantities can be sent by the respective entity to the peer-to-peer application. The entire peer-to-peer network can then perform the check.

Depending on the result of the check, the first entity may remit all (or only part) of the agreed price in the form of cryptocurrency in step 805. In step 806, the other entity receives the remitted cryptocurrency. Steps 805 and 806 are also carried out according to the previous explanation by the peer-to-peer application in a particularly tamper-proof manner. In particular, a previously described plausibility check can be carried out by at least some of the peers.

The entire peer-to-peer network can preferably check by means of cumulative processing power whether the energy quantities are correct and/or the remittance has been correctly carried out; so, for example, the first entity was actually the holder of the cryptocurrency.

It may also be provided that a network operator announces the actually measured meter values subsequently, for example once a month, week, etc., based on the meter data and makes an adjustment from this to the supply medium quantity actually exchanged in respect of the quantities measured in the peer-to-peer application. This adjustment may also be offset by means of the peer-to-peer application and, for example, between the entities.

Generally, the present system has the ability to validate individual meter data by nodes in the peer-to-peer network which is the basis for a "trustless" model. No trust in a central authority is needed. Validation and e.g. optimization of the peer-to-peer application or peer-to-peer matching can be done on-chain or off-chain, as described hereinbefore. Off-chain means that the process is controlled by the block chain. The process itself can be performed by other devices, such as servers/cloud. The block chain can check whether e.g. in the case of a validation process a plurality of servers provides a positive result or a negative result. In one implementation of the peer-to-peer network there can be only one validating peer or full node, e.g. only one node can be configured to perform a validation process, and one or more observing nodes. An observing node can validate transactions to establish a trust level but do not validate all transactions which is done by the validating peer.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A control system of a first entity, comprising:
at least one forecast module configured to create at least one supply medium plan of at least one supply medium unit of the first entity, wherein the forecast module is stored in memory,
wherein the at least one supply medium unit is a supply medium consumer and/or supply medium producer and/or supply medium storage,
wherein the at least one supply medium unit is connectable to at least one physical supply channel network,
at least one peer-to-peer module configured to receive at least one supply medium offer message of at least one further entity by communicating with at least one peer-to-peer application of at least one peer-to-peer network, wherein the at least one peer-to-peer module is stored in memory,
wherein the peer-to-peer network comprises a plurality of nodes, wherein the same peer-to-peer application is implemented on each node of the plurality of nodes, wherein the peer-to-peer application is a decentralized register, readable by participants of the peer-to-peer network,
wherein the peer-to-peer module is configured to cause generation of a supply medium transaction agreement about the physical exchange of a supply medium between the first entity and the further entity by means of the peer-to-peer application at least based on the supply medium plan and the at least one supply medium offer message,
wherein the generated supply medium transaction agreement is stored in the peer-to-peer application,
wherein the supply medium transaction agreement includes at least data about the quantity of a supply medium to be exchanged and the time period of the exchange, and
at least one controlling module configured to control the at least one supply medium unit in dependence of the generated supply medium transaction agreement by at least activating and/or deactivating the at least one supply medium unit based on the quantity of a supply medium to be exchanged and the time period of the exchange of the generated supply medium transaction agreement, wherein the at least one controlling module is stored in memory,
at least one metering module in form of a smart meter configured to measure the quantity of supply medium transferred via a connection of the first entity with the physical supply channel network,
wherein peer-to-peer module is configured to transmit the measured quantity of supply medium to the peer-to-peer application, and
wherein a check of the quantity of supply medium transmitted to the peer-to-peer application is carried out by the nodes of the peer-to-peer network, whether the supply medium quantity has been exchanged in accordance with the supply medium transaction agreement.

2. The control system according to claim 1, wherein
the supply medium plan is a supply medium consumption prediction for a future time period, and/or
the supply medium plan is a supply medium production prediction for a future time period.

3. The control system according to claim 1, wherein the at least one supply medium unit is a flexible supply medium unit.

4. The control system according to claim 3, wherein the at least one supply medium offer message comprises at least one information parameter of the group of: supply medium quantity, a time period and at least one transaction criterion.

5. The control system according to claim 4, wherein
the control system comprises at least one adapting module configured to adapt the supply medium plan of at least one flexible supply medium unit based on at least one information parameter of the at least one supply medium offer message, wherein the adapting module is stored in memory, and
wherein the peer-to-peer module is configured to cause generation of a supply medium transaction agreement about the physical exchange of a supply medium between the first entity and the further entity by means of the peer-to-peer application at least based on the adapted supply medium plan and the at least one supply medium offer message.

6. The control system according to claim 5, wherein the adapting module is configured to adapt the supply medium plan of at least one flexible supply medium unit based on at least one predetermined specification.

7. The control system according to claim 1, wherein at least the controlling module is part of a home automation controller.

8. The control system according to claim 1, wherein
the peer-to-peer application is a decentralized register, and
the decentralized register is readable by at least a part of the participants of the peer-to-peer network.

9. The control system according to claim 1, wherein the peer-to-peer application comprises encryption means and/or signature means and/or verification means, wherein at least one means of the encryption means and/or signature means and/or verification means is configured to store at least each supply medium transaction agreement generated.

10. The control system according to claim 1, wherein the peer-to-peer application is a block chain or a decentral ledger comprising at least two blocks connected to one another.

11. A home automation controller comprising a control system according to claim 1.

12. A supply system, comprising:
a first entity connectable to at least one physical supply channel network,
at least one further entity connectable to the physical supply channel network,
at least one peer-to-peer network configured to provide at least one peer-to-peer application,
wherein at least one of the entities comprises a control system according to claim 1, and
wherein the at least one other entity comprises at least one peer-to-peer module connectable to the peer-to-peer network.

13. A method of operating a control system, in particular a control system according to claim 1, comprising:
creating at least one supply medium plan of at least one supply medium unit of a first entity,
wherein the at least one supply medium unit is a supply medium consumer and/or supply medium producer and/or supply medium storage,
wherein the at least one supply medium unit is connectable to at least one physical supply channel network,
receiving at least one supply medium offer message of at least one further entity by communicating with at least one peer-to-peer application of at least one peer-to-peer network,
wherein the peer-to-peer network comprises a plurality of nodes, wherein the same peer-to-peer application is implemented on each node of the plurality of nodes, wherein the peer-to-peer application is a decentralized register, readable by participants of the peer-to-peer network,
causing generation of a supply medium transaction agreement about the physical exchange of a supply medium between the first entity and the further entity by means of the peer-to-peer application at least based on the supply medium plan and the at least one supply medium offer message,
wherein the generated supply medium transaction agreement is stored in the peer-to-peer application,
wherein the supply medium transaction agreement includes at least data about the quantity of a supply medium to be exchanged and the time period of the exchange, and
controlling the at least one supply medium unit in dependence of the generated supply medium transaction agreement by at least activating and/or deactivating the at least one supply medium unit based on the quantity of a supply medium to be exchanged and the time period of the exchange,
measuring the quantity of supply medium transferred via a connection of the first entity with the physical supply channel network,
transmitting, by the peer-to-peer module, the measured quantity of supply medium to the peer-to-peer application, and
checking the quantity of supply medium transmitted to the peer-to-peer application by the plurality of nodes of the peer-to-peer network, whether the supply medium quantity has been exchanged in accordance with the supply medium transaction agreement.

* * * * *

UNITED STATES PATENT AND TRADEMARK OFFICE
CERTIFICATE OF CORRECTION

PATENT NO. : 11,209,288 B2  Page 1 of 1
APPLICATION NO. : 15/992956
DATED : December 28, 2021
INVENTOR(S) : Carsten Stöcker et al.

It is certified that error appears in the above-identified patent and that said Letters Patent is hereby corrected as shown below:

On the Title Page

Item [71] delete "Carsten Stocker" and insert --Carsten Stöcker--

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*